(12) United States Patent
Bivans

(10) Patent No.: US 12,008,099 B2
(45) Date of Patent: Jun. 11, 2024

(54) METHOD FOR SAFETY RESPONSES TO SECURITY POLICY VIOLATIONS

(71) Applicant: Fort Robotics, Inc., Philadelphia, PA (US)

(72) Inventor: Nathan Bivans, Philadelphia, PA (US)

(73) Assignee: Fort Robotics, Inc., Philadelphia, PA (US)

( * ) Notice: Subject to any disclaimer, the term of this patent is extended or adjusted under 35 U.S.C. 154(b) by 0 days.

(21) Appl. No.: 18/136,471

(22) Filed: Apr. 19, 2023

(65) Prior Publication Data

US 2023/0351010 A1 Nov. 2, 2023

Related U.S. Application Data

(60) Provisional application No. 63/332,680, filed on Apr. 19, 2022.

(51) Int. Cl.
*G06F 21/50* (2013.01)
*G06F 21/00* (2013.01)
(Continued)

(52) U.S. Cl.
CPC ............ *G06F 21/50* (2013.01); *G06F 21/316* (2013.01); *G06F 21/335* (2013.01); *G06F 21/44* (2013.01);
(Continued)

(58) Field of Classification Search
CPC ...... G06F 21/50; G06F 21/316; G06F 21/335; G06F 21/44; G06F 21/629; G06F 21/52;
(Continued)

(56) References Cited

U.S. PATENT DOCUMENTS

| 4,363,973 A | 12/1982 | Kawata et al. |
| 5,974,529 A | 10/1999 | Zumkehr et al. |

(Continued)

FOREIGN PATENT DOCUMENTS

| CN | 103905466 A | 7/2014 |
| WO | 2007115272 A1 | 10/2007 |

(Continued)

OTHER PUBLICATIONS

Baee et al., "Broadcast Authentication in Latency-Critical Applications: On the Efficiency of IEEE 1609.2", IEEE, Dec. 2019, retrieved on [Jul. 3, 2022]. Retrieved from the internet entire document.

(Continued)

*Primary Examiner* — Edward Zee
(74) *Attorney, Agent, or Firm* — Run8 Patent Group, LLC; Peter Miller; Brian Chew

(57) ABSTRACT

A method includes, at a security agent executing on a computing platform including a set of resources and a first application: authenticating the security agent with a security device; accessing a configuration profile, from the security device, defining identity information associated with the first application and a first security policy defining a subset of resources, in the set of resources, to which the first application is permitted access; authenticating the first application based on the identity information; monitoring the set of resources responsive to execution of the first application on the computing platform; and issuing a command to cause the computing platform to enter a safe state in response to detecting an access by the first application to a first resource in the set of resources, the first resource excluded from the subset of resources.

16 Claims, 4 Drawing Sheets

(51) Int. Cl.
  *G06F 21/31* (2013.01)
  *G06F 21/33* (2013.01)
  *G06F 21/44* (2013.01)
  *G06F 21/62* (2013.01)
(52) U.S. Cl.
  CPC .... *G06F 21/629* (2013.01); *G06F 2221/2141* (2013.01)
(58) Field of Classification Search
  CPC . G06F 21/54; G06F 21/554; G06F 2221/2141
  See application file for complete search history.

(56) References Cited

U.S. PATENT DOCUMENTS

| | | |
|---|---|---|
| 6,105,150 A | 8/2000 | Noguchi et al. |
| 6,109,568 A | 8/2000 | Gilbert et al. |
| 6,792,562 B1 | 9/2004 | Korhonen |
| 8,204,712 B2 | 6/2012 | Katrak |
| 8,527,760 B2 | 9/2013 | Faiman et al. |
| 8,874,818 B2 | 10/2014 | Felth et al. |
| 8,977,414 B2 | 3/2015 | Yamada |
| 9,156,476 B2 | 10/2015 | O'neill et al. |
| 10,536,168 B2 | 1/2020 | Gstoettenbauer |
| 11,086,336 B1 | 8/2021 | Bolotski et al. |
| 11,127,295 B2 | 9/2021 | Radha et al. |
| 11,372,796 B2 | 6/2022 | Culca et al. |
| 11,455,223 B2 | 9/2022 | Nagy et al. |
| 11,500,715 B1 | 11/2022 | Katrak |
| 2004/0008467 A1 | 1/2004 | Calandre et al. |
| 2004/0015691 A1 | 1/2004 | Collette et al. |
| 2004/0078116 A1 | 4/2004 | Hashimoto et al. |
| 2004/0153786 A1 | 8/2004 | Johnson et al. |
| 2005/0091501 A1 | 4/2005 | Osthoff et al. |
| 2006/0247872 A1 | 11/2006 | Boutin |
| 2007/0050620 A1 | 3/2007 | Pham et al. |
| 2007/0160083 A1 | 7/2007 | Un et al. |
| 2007/0230627 A1 | 10/2007 | Veen et al. |
| 2008/0059867 A1 | 3/2008 | Lin et al. |
| 2008/0104674 A1 | 5/2008 | Sherkin et al. |
| 2009/0037776 A1 | 2/2009 | McAfee et al. |
| 2009/0043939 A1 | 2/2009 | Fuessl et al. |
| 2009/0055561 A1 | 2/2009 | Ritz et al. |
| 2009/0292951 A1 | 11/2009 | Fournier et al. |
| 2010/0031332 A1 | 2/2010 | Mason |
| 2010/0077031 A1 | 3/2010 | Yoneda et al. |
| 2010/0234968 A1 | 9/2010 | Kurachi |
| 2010/0292874 A1 | 11/2010 | Duggan et al. |
| 2011/0213984 A1 | 9/2011 | Orlando et al. |
| 2012/0086474 A1 | 4/2012 | Idiart |
| 2012/0143482 A1 | 6/2012 | Goossen et al. |
| 2012/0255021 A1 | 10/2012 | Sallam |
| 2013/0094509 A1 | 4/2013 | Chen et al. |
| 2013/0145214 A1 | 6/2013 | Provencher et al. |
| 2013/0158776 A1 | 6/2013 | Rini et al. |
| 2013/0270394 A1 | 10/2013 | Downs |
| 2014/0055077 A1 | 2/2014 | Barrass et al. |
| 2014/0108896 A1 | 4/2014 | Jung |
| 2014/0207953 A1 | 7/2014 | Beck et al. |
| 2014/0214248 A1 | 7/2014 | Yamada |
| 2014/0223057 A1 | 8/2014 | Fredriksson |
| 2014/0244006 A1 | 8/2014 | Lee |
| 2014/0350725 A1 | 11/2014 | LaFary et al. |
| 2014/0372758 A1 | 12/2014 | Agiwal et al. |
| 2016/0127187 A1 | 5/2016 | Chen et al. |
| 2016/0255501 A1 | 9/2016 | Phan et al. |
| 2017/0024500 A1 | 1/2017 | Sebastian et al. |
| 2017/0098363 A1 | 4/2017 | Pickett et al. |
| 2017/0192427 A1 | 7/2017 | Bivans et al. |
| 2018/0077146 A1 | 3/2018 | Lonas |
| 2018/0232270 A1 | 8/2018 | Otsuka et al. |
| 2018/0238490 A1 | 8/2018 | Hahn et al. |
| 2018/0329397 A1 | 11/2018 | Izzo et al. |
| 2019/0004489 A1 | 1/2019 | Stagg |
| 2019/0026103 A1 | 1/2019 | Maas |
| 2019/0033358 A1 | 1/2019 | Katrak |
| 2019/0056735 A1 | 2/2019 | Koopman et al. |
| 2019/0159237 A1 | 5/2019 | Wei et al. |
| 2019/0163558 A1 | 5/2019 | Tiedt et al. |
| 2019/0201136 A1 | 7/2019 | Shelton, IV et al. |
| 2019/0378610 A1 | 12/2019 | Barral et al. |
| 2020/0021618 A1* | 1/2020 | Smith ............... H04L 63/20 |
| 2020/0029343 A1 | 1/2020 | Wang et al. |
| 2020/0035087 A1 | 1/2020 | Teki et al. |
| 2020/0076860 A1 | 3/2020 | Motukuru et al. |
| 2020/0201336 A1 | 6/2020 | Myers et al. |
| 2020/0252162 A1 | 8/2020 | DenBoer et al. |
| 2020/0312155 A1 | 10/2020 | Kelkar et al. |
| 2021/0026320 A1 | 1/2021 | Bivans |
| 2021/0073098 A1 | 3/2021 | Maruyama |
| 2021/0105250 A1 | 4/2021 | Grinius et al. |
| 2021/0105346 A1 | 4/2021 | Pandey |
| 2021/0173961 A1 | 6/2021 | Young et al. |
| 2021/0262848 A1 | 8/2021 | Hoferer |
| 2021/0282117 A1 | 9/2021 | Bivans |
| 2021/0291835 A1 | 9/2021 | Jalali et al. |
| 2021/0295703 A1 | 9/2021 | Jalali et al. |
| 2022/0200818 A1 | 6/2022 | Bivans |
| 2023/0050149 A1 | 2/2023 | Shimamura |

FOREIGN PATENT DOCUMENTS

| | | |
|---|---|---|
| WO | 2012122994 A1 | 9/2012 |
| WO | 2014082051 A1 | 5/2014 |
| WO | 2018144560 A1 | 8/2018 |
| WO | 2020132258 A1 | 6/2020 |
| WO | 2021178693 A1 | 9/2021 |

OTHER PUBLICATIONS

Examination Report received in Australian Patent Application No. 2021232001 dated Nov. 9, 2022.
Final Office Action for U.S. Appl. No. 16/937,299 dated Jun. 16, 2022.
Final Office Action for U.S. Appl. No. 17/192,657 dated Jun. 30, 2023.
International Search Report for International Application No. PCT/US21/20911 dated Jun. 1, 2021.
International Search Report received in PCT/US2021/061275 dated Mar. 30, 2022.
International Search Report received in PCT/US2022/036002 dated Nov. 1, 2022.
International Search Report received in PCT/US22/52932 dated Apr. 12, 2023.
Non-Final Office Action for U.S. Appl. No. 17/192,657 dated Oct. 27, 2022.
Notice of Allowance and Fees Due for U.S. Appl. No. 17/332,635 dated Jul. 15, 2022.
Notice of Allowance and Fees Due for U.S. Appl. No. 17/856,661 dated Oct. 13, 2022.
Notice of Allowance and Fees Due for U.S. Appl. No. 17/856,700 dated Jun. 26, 2023.
Notice of Allowance received in U.S. Appl. No. 17/538,948 dated Dec. 15, 2022.
O'Dwyer. "Colour-Coded Batteries—Electro-Photonic Materials Circuitry for Enhanced Electrochemical Energy Storage and Optically Encoded Diagnostics." Jan. 19, 2016 (Jan. 19, 2016) Retrieved on Oct. 10, 2022 (Oct. 10, 2022) from entire document.
Reschka, Andreas , "Safety Concept for Autonomous Vehicles", Chapter from book Autonomous Driving_Technical, Legal and Social Aspects, pp. 473-496, May 2016.
Woodman, Roger, et al., "Building Safer Robots: Safety Driven Control", Bristol Robotics Laboratory, University of West of England, Bristol, England, http://www.brl.ac.uk, Sep. 26, 2012.
Woodman, Roger, et al., "Safety Control Architecture for Personal Robots: Behavioural Suppression with Deliberative Control", Warwick, The University of Warwick, submitted May 28, 2020, http://wrap.warwick.ac.uk/92090.

(56) References Cited

OTHER PUBLICATIONS

International Search Report and Written Opinion for International Patent Application No. PCT/US23/19061 dated Aug. 11, 2023; 11 pages.
Xu et al., "Microservice Security Agent Based On API Gateway in Edge Computing"; Sensors 2019, 19(22), 4905; https://doi.org/10.3390/s19224905; Nov. 10, 2019; retrieved on [Jun. 26, 2023]; retrieved from the internet entire document.
Notification of the International Application Number and of the International Filing Date for International Patent Application No. PCT/US23/19061; 1 page, Year: 2023.

* cited by examiner

METHOD FOR SAFETY RESPONSES TO SECURITY POLICY VIOLATIONS

CROSS-REFERENCE TO RELATED APPLICATIONS

This Application claims the benefit of U.S. Provisional Application No. 63/332,680, filed on 19 Apr. 2022, which is incorporated in its entirety by this reference.

This Application is related to U.S. patent application Ser. No. 16/937,299, filed on 23 Jul. 2020, U.S. patent application Ser. No. 17/856,661, filed on 1 Jul. 2022, and U.S. patent application Ser. No. 18/081,833, filed on 15 Dec. 2022, each of which is incorporated in its entirety by this reference.

TECHNICAL FIELD

This invention relates generally to the field of computer security and more specifically to a new and useful method for safety responses to security policy violations within the field of computer security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

Figure 1:
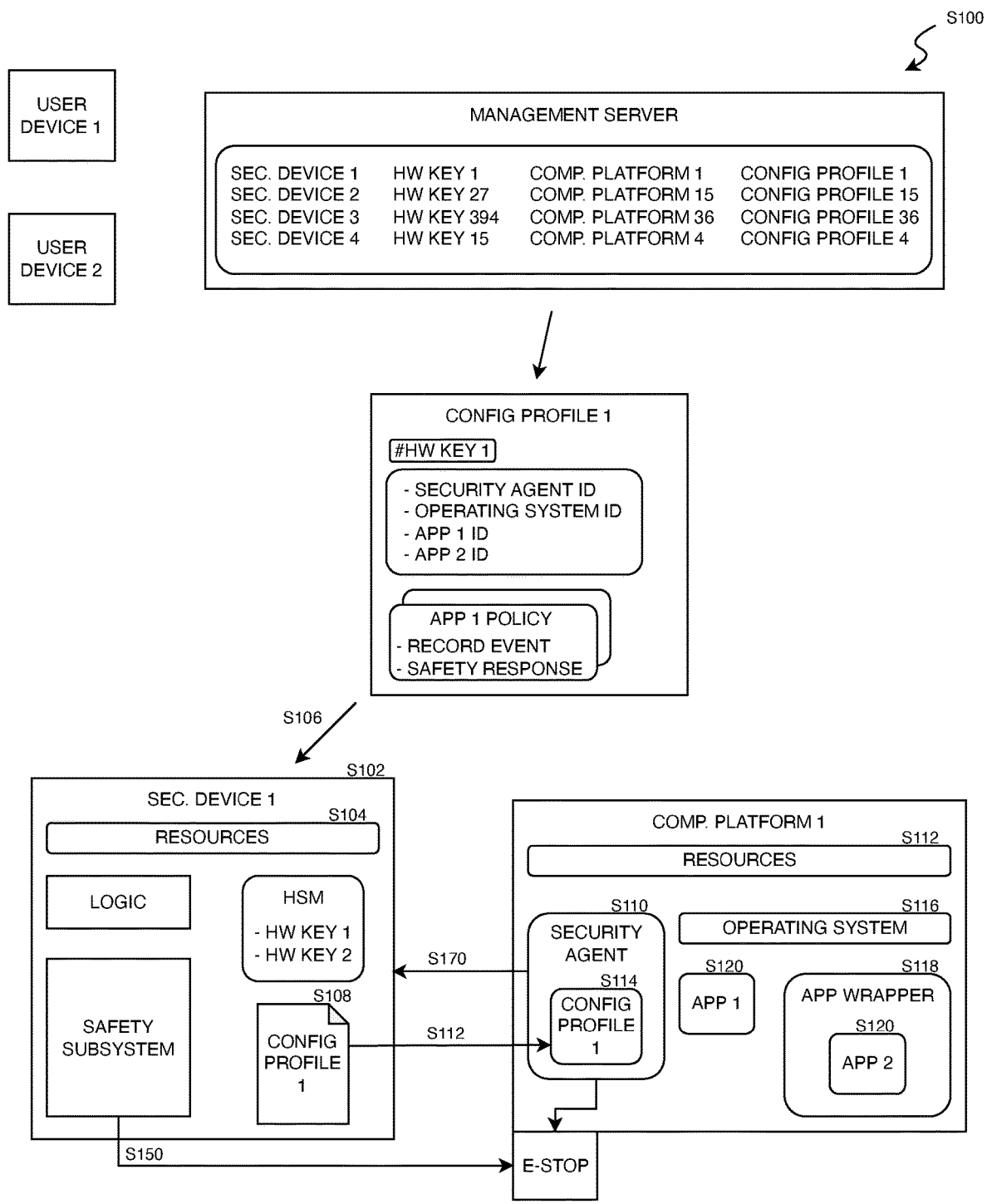
FIG. 1 is a flowchart representation of a method.
Figure 2:
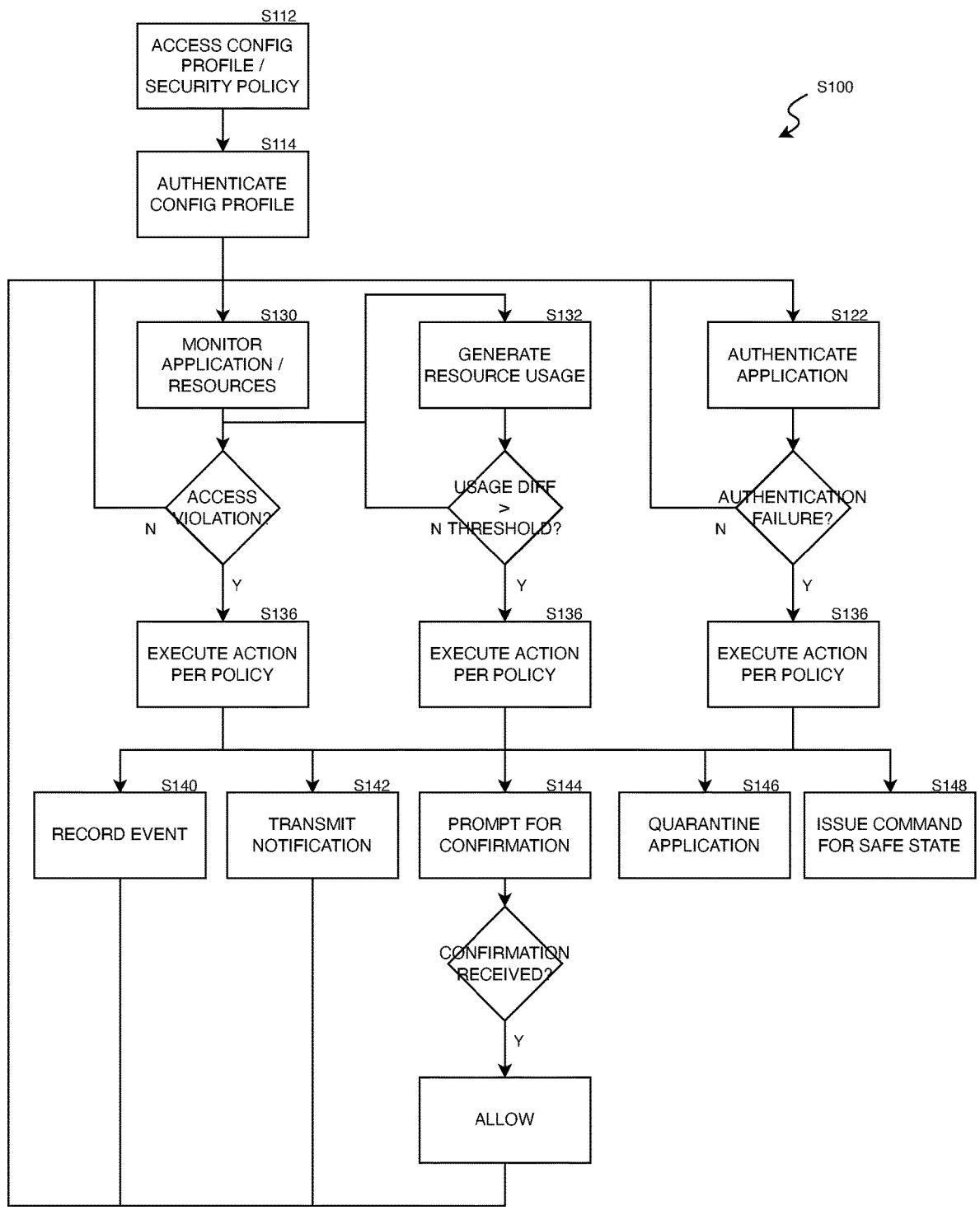
FIG. 2 is a flowchart representation of one variation of the method.

As shown in FIGS. 1 and 2, a method S100 includes, at a security agent executing on a computing platform including a set of resources, an operating system, and a first application, during a first time period: authenticating the security agent with a security device based on first identity information associated with the security agent in Block S110, the first identity information stored on the security device; and, in response to authenticating the security agent, accessing a configuration profile from the security device in Block S112. The first configuration profile can define: second identity information associated with the operating system; third identity information associated with the first application; and a first security policy defining a subset of resources, in the set of resources, to which the first application is permitted access and a first action responsive to a first violation of the first security policy.

The method S100 further includes: authenticating the operating system based on the second identity information in Block S116; and authenticating the first application based on the third identity information in Block S120.

The method S100 further includes, during a second time period succeeding the first time period: monitoring the set of resources responsive to execution of the first application on the computing platform in Block S130; and executing the first action in response to detecting an access by the first application to a first resource in the set of resources in Block S136, the first resource excluded from the subset of resources.

1.1 Variation: Network Communication Channel Access Violation

As shown in FIGS. 1 and 2, one variation of the method S100 includes, during a first time period, at a security device including a first set of resources including a hardware security module: authenticating the first set of resources based on first identity information associated with the first set of resources in Block S104, the first identity information stored in the hardware security module; and authenticating a configuration profile based on the first identity information in Block S108, the configuration profile associated with a computing platform communicatively coupled to the security device and including a second set of resources, an operating system, and a first application.

This variation of the method S100 further includes, during a second time period succeeding the first time period, at a security agent executing on the computing platform: authenticating the security agent with the security device based on second identity information associated with the security agent in Block S110, the second identity information specified in the configuration profile; and, in response to authenticating the security agent, accessing the configuration profile from the security device in Block S112. The configuration profile can define: third identity information associated with the operating system; fourth identity information associated with the first application; and a first security policy defining a subset of network communication channels, in a set of network communication channels, to which the first application is permitted access and a first action responsive to a first violation of the first security policy.

This variation of the method S100 further includes: authenticating the operating system based on the third identity information in Block S116; and authenticating the first application based on the fourth identity information in Block S120.

This variation of the method S100 further includes, during a third time period succeeding the second time period, at the security agent: monitoring the second set of resources responsive to execution of the first application on the computing platform in Block S130; and executing the first action in response to detecting an access by the first application to a first network communication channel in the set of network communication channels in Block S136, the first communication channel excluded from the subset of network communication channels.

1.2 Variation: Safety Response to Security Policy Violation

As shown in FIGS. 1 and 2, one variation of the method S100 includes, at a security agent executing on a computing platform including a set of resources and a first application, during a first time period: authenticating the security agent with a security device based on first identity information associated with the security agent in Block S110; and, in response to authenticating the security agent, accessing a configuration profile from the security device in Block S112, the configuration profile generated based on second identity information associated with the security device, the first configuration profile defining third identity information associated with the first application and a first security policy defining a subset of resources, in the set of resources, to which the first application is permitted access; and authenticating the first application based on the third identity information in Block S120.

This variation of the method S100 further includes, during a second time period succeeding the first time period: monitoring the set of resources responsive to execution of the first application on the computing platform in Block S130; and issuing a command to cause the computing platform to enter a safe state in response to detecting an access by the first application to a first resource in the set of resources in Block S148, the first resource excluded from the subset of resources.

2. APPLICATIONS

Generally, Blocks of the method S100 can be executed by a computer system (hereinafter "the system"): to associate a computing platform (e.g., a machine, a robot, a vehicle) with a security device that can perform functional safety operations; and to instantiate a security agent—on the computing platform—that cooperates with the security device to manage security and safety on the computing platform.

More specifically, Blocks of the method S100 can be executed by the system: to authenticate the security device based on pre-provisioned information stored in the security device; to access a configuration profile defining identity information associated with the security agent, an operating system, and a set of applications to be executed on the computing platform; to authenticate the configuration profile based on the pre-provisioned information; and to authenticate the security agent, the operating system, and the set of applications—based on the identity information—prior to execution on the computing platform.

Accordingly, Blocks of the method S100 can be executed by the system to verify that the configuration profile corresponds to the computing platform and the security device, thereby enabling the system to verify that the security agent, the operating system, and the set of applications to be executed on the computing platform are authentic, absent modification, and permitted on the computing platform based on the configuration profile.

2.1 Security Policy Violations and Responses

Additionally, Blocks of the method S100 can be executed by the system to establish a chain of trust—rooted in the security device—that extends to the operating system and the set of applications via the security agent, thereby enabling the security agent and the security device to perform security and/or safety actions associated with the computing platform.

Furthermore, Blocks of the method S100 can be executed by the system: to access the configuration profile defining a security policy associated with an application; to monitor execution of the application on the computing platform; and to execute an action in response to detecting a violation of the security policy, such as issuing a command to cause the computing platform to enter a predefined state (e.g., safe state).

Accordingly, by pairing the computing platform—which may not meet functional safety standards nor include security capabilities—with a security device, the system can extend the functional safety and security capabilities of the security device to the computing platform via the security agent, thereby mitigating security vulnerabilities that may lead to operational downtime, intellectual property theft, destruction of work product, human injury, and/or death due to attempted or successful infiltration.

2.2 Example

In one example application, Blocks of the method S100 are executed by a system including a first robot—in a set of robots operating in a work zone—and a first security device mounted on the first robot: to authenticate the first security device based on cryptographic information pre-provisioned in a hardware security module of the first security device; to access a configuration profile defining identification information associated with a security agent, an operating system, and an object detection application to be executed by the first robot; to authenticate the configuration profile based on the cryptographic information; and to initialize the security agent on the first robot.

In this example, Blocks of the method S100 are executed by the security agent on the first robot to: authenticate with the first security device; access the configuration profile; and authenticate the operating system and the object detection application based on the identification information defined in configuration profile.

Furthermore, Blocks of the method S100 are executed by the security agent on the first robot to: access the configuration profile further defining a security policy—associated with the object detection application—defining a subset of memory addresses to which the object detection application is permitted access; and monitor execution of the object detection application. In response to detecting an access—by the object detection application—to a memory address excluded from the subset of memory addresses, the security agent issues a command, to the first security device, to cause the first robot to enter a safe state. The first security device then transmits a signal to an emergency stop device—coupled to the first robot—to cause the first robot to enter a safe state.

Accordingly, Blocks of the method S100 are executed by the first robot and the first security device to: validate and monitor execution of the object detection application on the first robot; and to cause the first robot to enter a safe state in response to detecting unexpected execution behavior—which may be indicative of a cyber-attack—of the object detection application. Therefore, the system can enable each robot—in the set of robots—to detect security violations and locally trigger safety-critical responses, thereby preventing or mitigating damage to the set of robots or work product in the work zone, human injury, and/or death.

2.2 Operation System Security Policy Violation & Response

The method S100 as described herein is executed by a security agent executing on a computing platform to: monitor execution of an application on a computing platform; and execute an action in response to detecting a violation of a security policy associated with the application. However, the security agent can similarly execute Blocks of the method S100 to monitor execution of an operating system on the computing platform; and execute an action in response to detecting a violation of a security policy associated with the operating system.

3. TERMS

Generally, a "secret key" as referred to herein is a key associated with a particular entity (e.g., controller, device) in a population of devices and exclusively known by the particular entity and a key server.

Generally, a "symmetric key" as referred to herein is a cryptographic key utilized for encryption and decryption.

Generally, an "asymmetric key pair" as referred to herein is a pair of cryptographic keys—associated with a particular entity—including a public key and a private key.

4. SYSTEM

Generally, as shown in FIG. 1, the system can include: a computing platform; a security device communicatively coupled to the computing platform; and a management server (e.g., computing platform). The computing platform and the security device can be communicatively coupled to the management server via a communication network (e.g., local area network, wide area network, the Internet).

Additionally, the system can include a user device (e.g., status indicator, control panel, terminal, mobile device, smartphone) communicatively coupled to the security device, the computing platform, and/or the management server. In one example, the user device can be communicatively coupled to the security device and/or the computing platform through a direct communication channel via the communication network. In another example, the user device can be communicatively coupled to the security device and/or the computing platform through the management server. In yet another example, the user device can be coupled (e.g., directly coupled) to the security device and/or the computing platform.

The system can include additional computing platforms and/or security devices communicatively coupled to the management server via the communication network. More specifically, the system can include a set of computing platforms and a set of security devices, each security device—in the set of security devices—corresponding to a computing platform in the set of computing platforms. For example, each security device—in the set of security devices—can be mounted on a corresponding computing platform in the set of computing platforms.

The system can include additional user devices communicatively coupled to the security device(s), the computing platform(s), and/or the management server.

5. COMPUTING PLATFORM

Generally, a computing platform can include a sensor (e.g., radar sensor, LiDAR sensor, ultrasonic sensor, infrared camera), a machine, a robot, a vehicle (e.g., autonomous vehicle, semi-autonomous vehicle), a control system, an emergency stop system (e.g., line break sensor, emergency stop button) and/or an industrial system (e.g., manufacturing system, farming system, construction system, power system, transportation system), etc.

In one implementation, a computing platform can include a set of resources, such as a set of processors, volatile memory (e.g., random access memory or "RAM"), non-volatile memory (e.g., flash storage), an input/output interface, a set of network interfaces (e.g., wireless local area network interface, wired local area network interface, Bluetooth network interface), input devices (e.g., sensors, user interface), output devices (e.g., motor, actuator, hydraulic arm), etc.

Additionally, the computing platform can further include (e.g., stored in the non-volatile memory) an operating system (or kernel) and a set of applications. The computing platform can execute the operating system and/or the set of applications—such as an object detection application and a path planning application—utilizing the set of resources.

In another implementation, the computing platform can include a security agent that interfaces with the security device and/or the management server to manage security of the computing platform, as described below.

5.1 Machine Identity

Generally, a computing platform can exhibit a machine identity that uniquely identifies the computing platform in the set of computing platforms. For example, the computing platform can exhibit a machine identity based on a serial number that uniquely identifies the computing platform.

In one implementation, the computing platform can exhibit a machine identity based on a set of hardware-specific factors of the computing platform. In one example, the computing platform can exhibit a machine identity based on a chip built-in unique identifier—such as a processor unique identifier—associated with a processor of the computing platform. In another example, the computing platform can exhibit a machine identity based on a network interface hardware address (e.g., media access controller address or "MAC address") associated with a network interface of the computing platform.

Additionally or alternatively, the computing platform can exhibit a machine identity based on cryptographic information (e.g., secret keys, symmetric keys, asymmetric key pairs) correlated with the set of hardware-specific factors of the computing platform.

Accordingly, a particular computing platform—in a set of computing platforms that may be mass-produced with identical builds—can be uniquely identified based on this unique machine identity. Therefore, the system can ensure that this particular computing platform includes appropriate firmware, software, configuration information, licenses, and other information corresponding to its machine identity.

6. SECURITY DEVICE

Generally, a security device can perform safety critical diagnostics and control functions. For example, a security device can include hardware and/or software that meet functional safety standards (e.g., IEC 61508, ISO 13849, ISO 26262).

In one implementation, the security device can include a safety subsystem configured to perform functional safety operations, such as issuing commands to cause a corresponding computing platform (or a group of computing platforms) to enter a safe state, input validation, command validation, system health monitoring, communication integrity encapsulation, and/or output control, such as described in U.S. patent application Ser. No. 16/937,299, U.S. patent application Ser. No. 17/856,661, and U.S. patent application Ser. No. 18/081,833.

Additionally, the security agent can similarly implement safety critical diagnostics and control functions—on the computing platform—in cooperation with the security device.

In one implementation, a security device can cooperate with a security agent executing on a computing platform to: authenticate software (e.g., a security agent, the operating system, the set of applications) executing on the computing platform according to a configuration profile associated with the computing platform; monitor execution of the software on the computing platform; detect a violation of a security policy—defined by the configuration profile—based on execution of the software on the computing platform; and to respond to this violation according to an action specified by the security policy.

Accordingly, by pairing a computing platform—which may not meet functional safety standards nor include security capabilities—with a security device, the system can extend the functional safety and security capabilities of the security device to the computing platform via the security agent, thereby mitigating security vulnerabilities that may lead to operational downtime, intellectual property theft, destruction of work product, human injury, and/or death due to attempted or successful infiltration.

6.1 Security Device Architecture

Generally, a security device can include a set of resources, such as a set of controllers, volatile memory (e.g., RAM), non-volatile memory (e.g., flash storage), a set of network interfaces (e.g., wireless local area network interface, wired local area network interface, Bluetooth network interface), input/output interfaces, and/or a hardware security module. Additionally, the security device can further include: firmware, an operating system (or kernel), a set of applications, and/or logic.

In one implementation, the security device can include the set of resources including: a first controller (e.g., first safety controller); a second controller (e.g., second safety controller); a third controller (e.g., security controller); and a communication bus. The communication bus can support two-way communication between the first controller and the second controller, two-way communication between the first controller and the third controller, and two-way communication between the second controller and the third controller.

In one implementation, the first controller can include: an arithmetic logic unit (hereinafter "ALU"); volatile memory (e.g., RAM); and non-volatile memory (e.g., flash storage). The ALU can execute arithmetic and logic operations based on computer instructions executed by the first controller. The RAM can temporarily store data retrieved from storage for performing calculations. The flash storage can store data and/or instructions that are programmed into the first controller. The first controller can further include an input/output interface, an internal bus, and/or an internal oscillator. The first controller can include fewer or additional components.

The second controller can include analogous (e.g., similar, identical) components as the first controller. For example, the first controller and the second controller can be redundant controllers, each including identical components.

Furthermore, the third controller can include analogous (e.g., similar, identical) components as the first controller. The third controller can further include a network interface (or a set of network interfaces) for communication over the communication network.

6.2 Security Device Identity

Generally, a security device can exhibit a machine identity that uniquely identifies the security device in the set of security devices. For example, the security device can exhibit a machine identity based on a serial number that uniquely identifies the security device.

In one implementation, the security device can exhibit a machine identity based on a set of hardware-specific factors of the security device. In one example, the computing platform can exhibit a machine identity based on a chip built-in unique identifier of the security platform, such as a unique identifier associated with a controller of the security device and/or a unique identifier associated with the hardware security module. In another example, the security device can exhibit a machine identity based on a network interface hardware address (e.g., MAC address) associated with a network interface of the security device.

Accordingly, a particular security device—in a set of security devices—can be uniquely identified based on this unique machine identity. Therefore, the system can ensure that this particular security device includes appropriate firmware, software, configuration information, licenses, and other information corresponding to its machine identity.

6.3 Hardware Security Module

Generally, the security device can include identity information associated with the security device and the computing platform. The security device can utilize the identity information to authenticate elements (e.g., hardware, software) of the security device and/or the computing platform.

In one implementation, the security device can store identity information including cryptographic information, such as secret keys, symmetric keys, asymmetric key pairs for device identification, and/or asymmetric key pairs for communication.

In another implementation, the security device can store identity information including a machine identity of the security device and/or a machine identity of a computing platform (e.g., a machine identity of a computing platform corresponding to the security device).

In another implementation, the security device can store identity information associated with a first set of resources included in the security device. More specifically, the security device can store the identity information including cryptographic information correlated with a set of hardware-specific factors of the security device. For example, the security device can store identity information including cryptographic information correlated with: a chip built-in unique identifier of the security device (e.g., a unique identifier associated with a controller of the security device, a unique identifier associated with the hardware security module); and/or a network interface hardware address (e.g., MAC address) associated with a network interface of the security device.

In one implementation, the security device can store identity information associated with firmware, an operating system (or kernel), a set of applications, and/or logic of the security device. In one example, the security device can store identity information including an identifier (e.g., a unique identifier, a version number) of the firmware, the operating system, each application in the set of applications, and/or the logic. In another example, the security device can store identity information including cryptographic information (e.g., secret key, asymmetric key pair) correlated with the identifier.

In another implementation, the security device can store identity information associated with a second set of resources included in the computing platform. More specifically, the security device can store the identity information including cryptographic information correlated with a set of hardware-specific factors of the computing platform. For example, the security device can store identity information including cryptographic information correlated with: a chip built-in unique identifier of the computing platform (e.g., a unique identifier associated with a processor of the computing platform); and/or a network interface hardware address (e.g., MAC address) associated with a network interface of the computing platform.

In one implementation, the security device can store the identity information in the hardware security module of the security device. More specifically, the hardware security module can be provisioned (or "pre-provisioned") with the identity information (or a portion of the identity information) prior to deployment and/or runtime of the security device.

7. SECURITY AGENT

In one implementation, the computing platform can include a security agent that interfaces with a corresponding security device and/or the management platform.

In one example, the security agent—executing on the computing platform—can cooperate with the security device to authenticate the security agent, the operating system, and/or the set of applications on the computing platform according to a configuration profile, as described below.

In another example, the security agent can: monitor execution of the set of applications on the computing platform to generate runtime execution metrics; detect a violation of a security policy—defined by the configuration profile—during execution of the set of applications; and respond to this violation according to an action specified by the security policy. In this example, the security agent can transmit—to the management server—the runtime execution metrics and/or an alert representing the violation.

8. MANAGEMENT SERVER

Generally, the management server can generate a set of configuration profiles, each configuration profile defining: identity information associated with a security agent, operating system, and/or an application included in a computing platform; and a set of security policies associated with the security agent, operating system, and/or the application.

In one implementation, the management server can generate a configuration profile based on identity information associated with a security device corresponding to the computing platform. More specifically, the management server can generate the configuration profile based on cryptographic information correlated with a unique identifier (e.g., controller unique identifier, hardware security module unique identifier, MAC address) associated with the security device, thereby uniquely mapping the configuration profile to the security device.

Accordingly, because the management server generates each configuration profile uniquely mapped to a security device and a corresponding computing platform, the security device and/or the security agent executing on the computing platform can authenticate applications on the computing platform based on the configuration profile and corresponding identity information securely stored in the security device. Therefore, the system can uniquely identify applications executing on the computing platform and enforce specific security policies applied to these applications during execution on the computing platform.

8.1 Security Device Registration

Generally, for each security device in the set of security devices, the management server can store identity information associated with the security device. For example, the management server can store identity information including a machine identity associated with the security device.

In one implementation, the management server can receive registration information linking a security device—in the set of security devices—with a user identity associated with a user (e.g., an operator, a group of operators, an organization), thereby linking the security device with a group of computing platforms associated with the user identity.

In one example, the management server can receive registration information specifying a first serial number of a first security device—in the set of security devices—and a first user identity in the set of user identities. The management server can then link the first security device with a group of computing platforms associated with the first user identity.

In another example, the management server can receive registration information specifying the first serial number of the first security device and a second serial number of a first computing platform in the group of computing platforms associated with the first user identity. The management server can then link the first security device with the first computing platform.

In response to linking the security device to a user identity and/or a computing platform, the management server can generate a configuration profile defining a valid set of software for the computing platform. More specifically, the management server can generate the configuration profile defining identity information for a security agent, operating system, and/or a set of applications on the computing platform, as described below.

8.2 Software Registration

Generally, the management server can store validation information associated with software (e.g., security agent, operating system, applications) to be deployed on a computing platform.

In one implementation, the management server can store validation information associated with a valid set of instructions representing the security agent, a valid set of instructions representing the operating system, and/or a valid set of instructions representing each application in the set of applications. For example, the management server can receive the validation information and/or these valid sets of instructions from a software developer(s)—associated with the security agent, the operating system, and/or the set of applications—during a software registration process.

Accordingly, the system can authenticate software to be executed on the computing platform based on the validation information, thereby verifying the software to be executed on the computing platform is authentic and absent modification.

9. CONFIGURATION PROFILES

Generally, the management server can generate a configuration profile defining: identity information associated with a security agent, operating system, and/or a set of applications included in a computing platform; and a set of security policies associated with the security agent, operating system, and an application.

9.1 Computing Platform Configuration

In one implementation, the management server can: receive a configuration for a computing platform associated with a user identity; and generate a configuration profile based on the configuration. More specifically, the management server can receive the configuration defining an operating system (or kernel) and an application to be deployed and executed on the computing platform. The management server can then generate the configuration profile defining: first identity information associated with the security agent; second identity information associated with the operating system; and third identity information associated with the application. Additionally, the management server can generate the configuration profile based on fourth identity information associated with a security device linked with the computing platform.

For example, the management server can receive—from a user device associated with the user identity—a first configuration for a first computing platform in a group of computing platforms associated with the user identity, the configuration defining: a first operating system (e.g., a first operating system exhibiting a first version identifier) in a set of operating systems; and a subset of applications in a set of applications, the subset of applications including a first application (e.g., an object detection application exhibiting a second version identifier) and a second application (e.g., a path planning application exhibiting a third version identifier).

In this example, in response to receiving the first configuration from the user device, the management server can generate a first configuration profile based on the first configuration. More specifically, the management server can generate the first configuration profile defining: first identity information associated with the security agent; second identity information associated with the first operating system; third identity information associated with the first application; and fourth identity information associated with the second application.

Additionally, in this example, the management server can generate the first configuration profile based on fifth identity information associated with a first security device linked to the first computing platform. More specifically, the management server can generate the first configuration profile based on the fifth identity information including cryptographic information correlated with a hardware security module unique identifier associated with the first security device, such as cryptographic information correlated with a chip built-in unique identifier of the security platform (e.g., a unique identifier associated with a controller of the first security device, a unique identifier associated with the hardware security module) and/or cryptographic information correlated with a network interface hardware address (e.g., MAC address) associated with a network interface of the first security device.

Accordingly, because the management server generates the first configuration profile based on the fifth identity information associated with the first security device, the first security device can authenticate the first configuration profile based on pre-provisioned identity information—matching the fifth identity information—in the hardware security module of the first security device. Therefore, the first security device can ensure that the first configuration profile corresponds to the first security device and the first computing platform.

In one implementation, the management server can generate a configuration profile further defining cryptographic information associated with secure communication. For example, the management server can generate the configuration profile further defining a set of symmetric keys and/or a set of asymmetric key pairs with which the security device and/or the computing platform (e.g., the security agent executing on the computing platform) can engage in secure communication with other devices.

9.2 Identity Information

Generally, the management server can generate a configuration profile defining identity information of a security agent, an operating system (or kernel), and/or a set of applications to be deployed and/or executed on a computing platform. Additionally, the management server can generate the configuration profile based on identity information of a security device corresponding (e.g., linked) to the computing platform.

9.2.1 Security Agent Identity Information

In one implementation, the management server can generate the configuration profile defining first identity information associated with the security agent. In one example, the management server can generate the configuration profile defining the first identity information including an identifier (e.g., a unique identifier, a version number) of the security agent. Additionally or alternatively, the management server can generate the configuration profile defining the first identity information including cryptographic information (e.g., secret key, asymmetric key pair) correlated with the identifier of the security agent. In another example, the management server can generate the configuration profile defining the first identity information including validation information associated with a valid set of instructions representing the security agent. The management server can generate the configuration profile defining the first identity information including other information associated with the security agent.

9.2.2 Operating System & Application Identity Information

In one implementation, the management server can implement similar methods and techniques to generate the configuration profile defining respective identity information associated with the operating system (or kernel) and/or each application in the set of applications. For example, the management server can generate the configuration profile defining respective identity information defining: an identifier (e.g., a unique identifier, a version number) of the software element (e.g., operating system, application); cryptographic information (e.g., secret key, asymmetric key pair) correlated with the identifier of the software element; and/or validation information associated with a valid set of instructions representing the software element.

9.3 Security Policies

Generally, the management server can generate a configuration profile further defining a set of security policies. More specifically, the management server can generate the configuration profile further defining the set of security policies, each security policy—in the set of security policies—associated with the security device and/or the computing platform associated with the configuration profile.

In one implementation, the management server can generate a configuration profile further defining the set of security policies, each security policy—in the set of security policies—defining: a rule; and a first action responsive to violation of the rule. Additionally or alternatively, the management server can generate the configuration profile further defining each security policy—in the set of security policies—defining: a rule; and a second action responsive to adherence of the rule. The management server can generate the configuration profile defining a security policy defining: a set of rules; and, for each rule in the set of rules, a set of actions responsive to violation of (or adherence to) the rule.

9.3.1 Security Policies: Authentication

Generally, the management server can generate a configuration profile further defining a security policy associated with authentication. More specifically, the management server can generate a configuration profile defining a security policy associated with authentication of the security device, the configuration profile, the security agent, the operating system, and/or the set of applications.

In one implementation, the management server can generate a configuration profile defining a security policy associated with authentication during an initialization period (e.g., boot, launch) of the security device, the configuration profile, the security agent, the operating system, and/or the set of applications.

For example, the management server can generate a configuration profile defining a first security policy defining: a rule specifying authentication of an application—during an initialization period (e.g., preceding a runtime execution period) of the application—based on identity information associated with the application; and an action responsive to a violation of the first security policy (i.e., the rule). More specifically, the management server can generate the configuration profile defining the security policy defining the action responsive to detecting an authentication failure of the application—during the initialization period of the application—based on the identity information associated with the application.

Additionally or alternatively, the management server can similarly generate a configuration profile defining a second security policy associated with authentication during a runtime execution period (e.g., succeeding the initialization period) of the security device, the configuration profile, the security agent, the operating system, and/or the set of applications.

9.3.2 Security Policies: Resource Access & Usage

Generally, the management server can generate a configuration profile further defining a security policy associated with access to a set of resources of the computing platform. More specifically, the management server can generate a configuration profile defining a security policy associated with access to the set of resources of the computing platform by the security agent, the operating system, and/or the set of applications.

In one implementation, the management server can generate the configuration profile defining the security policy defining: a subset of resources (e.g., processor resources, memory resources, network interface resources, input/output device resources)—in the set of resources of the computing platform—to which the security agent, the operating system, and/or the set of applications is permitted access (e.g., during execution); and an action responsive to detecting a violation (e.g., access to a resource excluded from the subset of resources) of the security policy.

In one example, the management server can generate the configuration profile defining a third security policy defining: a subset of memory addresses—in the set of resources of the computing platform—to which a first application is permitted access during execution; and a third action responsive to detecting access (or attempted access) to a first memory address by the first application, the subset of memory addresses excluding the first memory address.

In another example, the management server can generate the configuration profile defining a fourth security policy defining: a subset of network interfaces—in the set of resources of the computing platform—to which the first application is permitted access during execution; and a fourth action responsive to detecting access (or attempted access) to a first network interface by the first application, the subset of network interfaces excluding the first network interface.

In another implementation, the management server can generate the configuration profile defining a fifth security policy defining: a model characterizing an expected usage pattern (e.g., execution time, memory footprint, network message data rate) of the subset of resources during execution; and a fifth action responsive to detecting a difference between a usage pattern and the first model exceeding a threshold amount (e.g., 10%, 25%).

Accordingly, the system can: define a subset of resources of a computing platform—to which an application is permitted to access—based on expected execution behavior of the application; and enforce access to the subset of resources during execution, thereby enabling the system the detect unusual execution behavior of the application and mitigate security vulnerabilities associated with the unusual execution behavior.

9.3.3 Security Policies: Network Communication Channel Access

Generally, the management server can generate a configuration profile further defining a security policy associated with access to a set of network communication channels by the security agent, the operating system, and/or the set of applications.

In one implementation, the management server can generate the configuration profile defining the security policy defining: a subset of network communication channels—in a set of network communication channels—to which the security agent, the operating system, and/or the set of applications is permitted access (e.g., during execution); and an action responsive to detecting a violation (e.g., access to a network communication channel excluded from the subset of network communication channels) of the security policy.

9.3.4 Security Policies: Network Message Timing

Generally, the management server can generate a configuration profile further defining a security policy associated with network messages generated and/or transmitted by the security agent, the operating system, and/or the set of applications.

In one implementation, the management server can generate the configuration profile defining the security policy defining: a periodic network message at a predefined time interval (e.g., 200 milliseconds, 5 minutes, 1 hour); and an action responsive to detecting a violation of the security policy (e.g., detecting absence of a network message during a time interval exceeding the predefined time interval).

9.3.5 Security Policies: Actions

Generally, the management server can generate a configuration profile defining a security policy defining an action(s) responsive to a violation of the security policy, such as: recording an event associated with the violation; transmitting a notification specifying the violation to a user device and/or the management server; prompting the user device to confirm the violation; quarantining an application associated with the violation; and/or transmitting a command to cause the computing platform to enter a safe state, as described below.

10. AUTHENTICATION

Generally, the system can perform a set of authentication processes to establish trust in a security device and a computing platform. More specifically, during an initialization period (e.g., preceding a runtime execution period), the system can: authenticate the security device based on identity information stored in the hardware security module of the security device; and authenticate a configuration profile generated by the management server based on the identity information stored in the hardware security module of the security device. In response to authenticating the configuration profile, the system can then authenticate software elements of the computing platform (e.g., the security agent, the operating system, the set of applications) based on the configuration profile.

10.1 Security Device Authentication

Block S104 of the method S100 recites authenticating the first set of resources based on first identity information associated with the first set of resources, the first identity information stored in the hardware security module.

Generally, during an initialization period, the security device—including a first set of resources (e.g., controllers, memory, network interfaces, hardware security module)—can perform an authentication process based on first identity information associated with the security device, the first identity information stored (e.g., pre-provisioned) in the hardware security module.

In one implementation, in Block S102, the security device can execute a secure boot.

In response to executing the secure boot, the security device can: access first identity information stored in the hardware security module; and authenticate the first set of resources based on the first identity information in Block S104. In one example, the security device can authenticate a first controller—in the first set of resources—based on the first identity information including cryptographic information correlated with a unique identifier of the first controller. In another example, the security device can authenticate a first network interface—in the first set of resources—based on the first identity information including cryptographic information correlated with a unique identifier of the first network interface.

Similarly, the security device can authenticate firmware, an operating system (or kernel), software applications, and/ or logic of the security device based on the first identity information.

Accordingly, because the security device can authenticate elements of the security device based on trusted identity information stored in the hardware security module, the system can establish the security device as a root of trust with which to authenticate the configuration profile, the security agent, the operating system of the computing platform, and the set of applications on the computing platform. Therefore, the system can extend a chain of trust from the security device to the set of applications based on the trusted identity information in the hardware security module.

10.2 Configuration Profile Authentication

Block S106 of the method S100 recites accessing the configuration profile from a management server, the configuration profile generated by the management server based on cryptographic information correlated with the first identity information.

Block S108 of the method S100 recites authenticating a configuration profile based on the first identity information.

Generally, in response to authenticating resources of the security device, the security device can: access a configuration profile; and authenticate the authentication profile based on the identity information stored in the hardware security module.

In one implementation, in Block S106, the security device can access a configuration profile—from the management server—associated with the security device and a corresponding computing platform. More specifically, the security device can receive the configuration profile from the management server through a secure communication channel based on cryptographic information (e.g., a first asymmetric key pair) stored in the hardware security module.

In another implementation, in Block S108, the security device can authenticate the configuration profile based on the identity information stored in the hardware security module. More specifically, because the management server generates the configuration profile based on the identity information associated with the security device, the security device can authenticate the configuration profile based on the identity information stored in the hardware security module.

For example, the security device can: access the configuration profile from the management server, the configuration profile based on first cryptographic information correlated with a unique identifier of the hardware security module in the security device; and access identity information—stored in the hardware security module—including second cryptographic information correlated with the unique identifier of the hardware security module. In this example, the security device can authenticate the configuration profile in response to detecting a match between the first cryptographic information and the second cryptographic information. However, in response to detecting a difference between the first cryptographic information and the second cryptographic information, the security device can detect an authentication failure of the configuration profile. In response to detecting the authentication failure, the security device can execute an action, such as recording an event, transmitting a notification to a user device, and/or transmitting a command to cause the computing platform to enter a safe state.

10.2 Security Agent Authentication

Block S110 of the method S100 recites authenticating the security agent with a security device based on first identity information associated with the security agent, the first identity information stored on the security device.

Generally, the computing platform can execute a boot procedure and initialize (e.g., launch) the security agent on the computing platform. The security agent can authenticate with the security device based on the configuration profile defining identity information associated with the security agent.

In one implementation, in Block S110, the security agent can authenticate with the security device based on identity information associated with the security agent, the identity information—associated with the security agent—specified in the configuration profile and/or stored in the security device.

For example, the security agent can authenticate with the security device based on identity information associated with the security agent by transmitting first identity information (e.g., an identifier, cryptographic information correlated with the identifier) associated with the security agent to the security device. In response to receiving the first identity information, the security device can: access the configuration profile defining second identity information associated with the security agent; and, in response to detecting a match between the first identity information and the second identity information, the security device can authenticate the security agent. However, in response to a difference between the first identity information and the second identity information, the system (e.g., the security agent, the security device) can: detect an authentication failure of the security agent; and execute an action, such as recording an event, transmitting a notification to a user device, and/or transmitting a command to cause the computing platform to enter a safe state.

Accordingly, the security agent can cooperate with the security device to authenticate the security agent on the computing platform. Therefore, the system can extend trust from the security device to the security agent, thereby enabling the security agent to manage security on the computing platform and execute a safety-critical response to a security violation.

10.4 Operating System & Application Authentication

Block S112 of the method S100 recites, in response to authenticating the security agent, accessing a configuration profile from the security device, the first configuration profile defining: second identity information associated with the operating system; and third identity information associated with the first application.

Block S114 of the method S100 recites, in response to accessing the configuration profile from the security device, authenticating the configuration profile based on cryptographic information correlated with a unique identifier associated with a hardware security module of the security device, the cryptographic information stored in the hardware security module.

Blocks of the method S100 recite: authenticating the operating system based on the second identity information in Block S116; and authenticating the first application based on the third identity information in Block S120.

Generally, the security agent can access a configuration profile defining a configuration (e.g., software configuration) of a computing platform. More specifically, the security agent can access the configuration profile defining: identity information associated with the operating system (or kernel); and identity information associated with a first application. The security agent can access the configuration profile defining additional information (e.g., identity information associated with additional applications).

In one implementation, in Block S112, the security agent can access the configuration profile from the security device. For example, in response to the security agent authenticating with the security device, the security agent can receive the configuration profile from the security device through a secure communication channel based on cryptographic information (e.g., a second asymmetric key pair) stored in the hardware security module.

In Block S114, in response to accessing the configuration profile, the security agent can authenticate the configuration profile based on identity information associated with the security device. For example, the security agent can authenticate the configuration profile based on cryptographic information correlated with a unique identifier associated with a hardware security module of the security device.

Generally, the security agent can authenticate an operating system (or kernel) and a set of applications of the computing platform in response to accessing and/or authenticating the configuration profile. For example, the security agent can authenticate an operating system (or kernel) and a set of applications during an initialization period preceding a runtime execution period of the operating system and the set of applications.

In one implementation, in Block S116, the security agent can authenticate the operating system (or kernel) based on the identity information—associated with the operating system—defined in the configuration profile.

For example, the security agent can: access an identifier (e.g., version number) associated with the operating system; and access the identity information associated with the operating system defined in the configuration profile. In this example, the security agent can authenticate the operating system in response to detecting a match between the identifier and the identity information associated with the operating system.

Accordingly, by authenticating the operating system in the computing system, the security agent can extend trust to the operating system including core resources for process management and network communications, thereby enabling the security agent to trust and utilize these core resources.

However, in response to detecting a difference between the identifier and the identity information associated with the operating system, the security agent can: detect an authentication failure of the operating system; and execute an action (e.g., an action defined in a security policy of the configuration profile), such as recording an event, transmitting a notification to a user device, and/or transmitting a command to cause the computing platform to enter a safe state.

In another implementation, in Block S120, the security agent can implement similar methods and techniques to authenticate the first application. More specifically, in response to authenticating the operating system, the security agent can authenticate the first application based on the identity information—associated with the first application—defined in the configuration profile.

For example, the security agent can: access an identifier (e.g., version number) associated with the first application; and access the identity information associated with the first application defined in the configuration profile. In this example, the security agent can authenticate the first application in response to detecting a match between the identifier and the identity information associated with the first application.

Accordingly, by authenticating the first application in the computing system, the security agent can thereby complete a chain of trust extending from the security device to the first application.

The security device can implement similar methods and techniques to execute an action in response to detecting an authentication failure of the first application. For example, in response to detecting a difference between the identifier and the identity information associated with the first application, the security agent can: detect an authentication failure of the first application; and execute an action (e.g., an action defined in a security policy of the configuration profile), such as recording an event, transmitting a notification to a user device, quarantining the first application, and/or transmitting a command to cause the computing platform to enter a safe state.

Additionally, the security agent can execute similar methods and techniques to authenticate other applications in the computing platform based on identity information associated with these applications defined in the configuration profile.

10.4.1 Application Validation Information Verification

Additionally or alternatively, the security agent can authenticate an application in the set of applications based on validation information associated with a valid set of instructions representing the application.

In one implementation, the security agent can access the configuration profile defining the identity information—associated with the application—including validation information (e.g., cyclic redundancy check value, checksum value, cryptographic hash value, other error detecting code) associated with a valid set of instructions representing the application. The security agent can authenticate the application based on the validation information.

In one example, the security agent can authenticate the application based on a cyclic redundancy check of the application and the validation information. In this example, the security agent can: access the validation information including a cyclic redundancy check value associated with the valid set of instructions representing the application; calculates a first value based on a cyclic redundancy check of the application; and authenticate the application in response to verifying a match between the first value and the cyclic redundancy check value.

In another example, the security agent can authenticate the application based on verification of the application and a cryptographic hash value included in the validation information, More specifically, the security agent can: access the validation information including a cryptographic hash value associated with the valid set of instructions representing the application; calculates a second value based on a cryptographic hash (e.g., MD5, SHA-1, SHA-256) of the application; and authenticate the application in response to verifying a match between the second value and the cryptographic hash value.

In another implementation, the security agent can implement similar methods and techniques to authenticate the security agent and/or the operating system based on validation information (e.g., cyclic redundancy check value, checksum value, cryptographic hash value, other error detecting code). In one example, the security agent can authenticate the security agent based on a cyclic redundancy check of the security agent and validation information associated with a valid set of instructions representing the security agent. In another example, the security agent can authenticate the operating system based on a cyclic redundancy check of the operating system and validation information associated with a valid set of instructions representing the operating system.

Accordingly, the system can authenticate software to be executed on the computing platform based on the validation information, thereby verifying the software to be executed on the computing platform is authentic and absent modification.

10.4.2 Application Wrappers

Generally, the computing platform can initialize an application in an application container (e.g., application wrapper). For example, the security agent can cooperate with the application wrapper—containing an application—to manage security of the application executing within the application wrapper on the computing platform.

In one implementation, in Block S118, the security agent can initialize an application in an application wrapper on the computing platform.

In another implementation, in Block S120, the security agent can authenticate the application based on the application wrapper and identity information associated with the application. For example, the security agent can authenticate the application in response to: validating contents of the application wrapper; and detecting a match between an identifier of the application and identity information—associated with the application—defined in the configuration profile. More specifically, the security agent can validate the contents of the application wrapper based on validation information—associated with the application wrapper—defined in a security policy of the configuration profile.

Accordingly, the system can implement a lightweight application wrapper to initialize and authenticate each application on the computing platform, thereby enabling the system: to isolate each application on the computing platform; and to protect the computing platform against security vulnerabilities associated with each application.

10.5 Runtime Authentication

Generally, the security agent can implement similar methods and techniques described above to periodically authenticate an application during a runtime execution period succeeding the initialization period.

In one implementation, the security agent can access a configuration profile defining a security policy defining a periodic cyclic redundancy check of an application—based on validation information associated with the application—at a predefined time interval (e.g., 5 minutes, 60 minutes) during runtime execution of the application.

In another implementation, in Block S122, the security agent can periodically perform a cyclic redundancy check of the application and the validation information associated with the application at the predefined time interval. The security device can execute an action (e.g., an action specified in the security policy) in response to detecting a failure of the cyclic redundancy check.

Additionally or alternatively, the security agent can access a configuration profile defining a security policy defining a periodic verification of an application—based on other validation information, such as a cryptographic hash value, associated with a valid set of instructions representing the application—at the predefined time interval (or another time interval) during runtime execution of the application. The security agent can: periodically calculate a value based on a cryptographic hash of the application; and execute the action in response to detecting a difference between the value and the cryptographic hash value.

Therefore, the security agent can verify that the application executing on the computing platform is authentic and absent modification throughout execution.

Additionally, the system can implement similar methods and techniques to periodically authenticate the security device, the configuration profile, the security agent, and/or the operating system during a runtime execution period of the computing platform.

11. RUNTIME EXECUTION MONITORING

Block S130 of the method S100 recites monitoring the set of resources responsive to execution of the first application on the computing platform.

Block S132 of the method S100 recites generating a first usage pattern of the subset of resources by first application during execution on the computing platform.

Block S134 of the method S100 recites monitoring a set of network messages from the first application.

Figure 3:
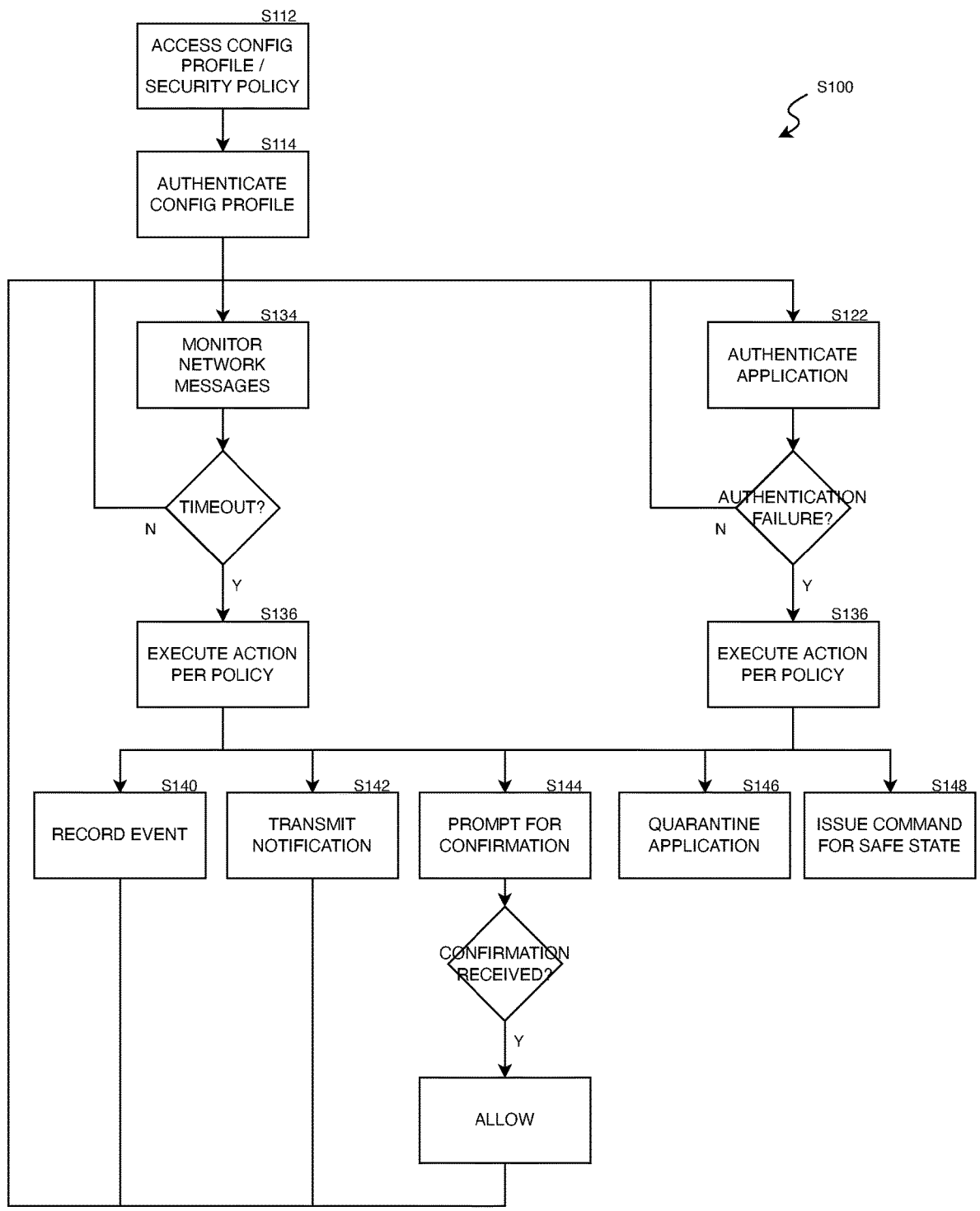
FIG. 3 is a flowchart representation of one variation of the method.

Generally, as shown in FIGS. 2 and 3, the security agent can monitor runtime execution of the operating system and/or the set of applications on the computing platform, such as in response to authenticating the operating system and the set of applications.

In one implementation, in Block S130, the security agent can monitor the set of resources of the computing platform responsive to execution of an application on the computing platform. More specifically, the security agent can detect access (or attempted access) to the set of resources by the application during execution. In one example, the security monitor can detect a set of memory addresses accessed by an application during execution. In another example, the security agent can detect a network interface and/or an input/output device accessed by the application during execution. In yet another example, the security agent can detect a software library and/or a set of data accessed by the application during execution.

In another implementation, in Block S132, the security agent can generate a usage pattern of resources utilized by the application during execution. For example, the security agent can generate a usage pattern characterizing processor usage, memory access, and/or network access by the application during execution.

In another implementation, the security agent can monitor a set of network messages from the application. More specifically, the security agent can: monitor a set of network messages transmitted by the application; and generate a set of timing metrics associated with the set of network messages. For example, the security agent can generate a first subset of metrics based on: a period of a network message (e.g., a difference between a receipt time of a network message and a receipt time of a prior network message); a predefined period for the set of network messages (e.g., a period defined in a security policy of the configuration profile); and/or an average period for network messages in the set of network messages. For example, the set of messages can include a set of heartbeat signals, a set of status messages, and/or other data.

In one implementation, the security agent can communicate resource access information and/or the usage pattern to the management server and/or to a user device, thereby enabling remote monitoring of application execution.

In another implementation, the security agent can cooperate with the operating system to monitor the set of resources of the computing platform. Additionally or alternatively, the security agent can cooperate with an application wrapper to monitor the set of resources of the computer platform responsive to execution of the application within the application wrapper.

Additionally or alternatively, the security agent can implement similar methods and techniques to detect access to the set of resources by the operating system during execution and/or generate a usage pattern of resources utilized by the operating system during execution.

Accordingly, the security agent can monitor runtime execution of the operating system and/or the set of resources of the computing platform, thereby enabling the security agent to detect and respond to security policy violations, as described below.

12. RESPONSES TO POLICY VIOLATION

Generally, the security agent can: access a configuration profile defining a security policy associated with an application; and monitor execution of the application on the computing platform. In response to detecting a violation of the security policy by the application, the security agent can execute an action defined in the security policy, such as recording an event associated with the violation, transmitting a notification specifying the violation, prompting a user device to confirm the violation, quarantining the application, and/or triggering a safety-critical response in the computing platform.

12.1 Resource Access Violation

Block S112 of the method S100 recites, in response to authenticating the security agent, accessing a configuration profile from the security device, the first configuration profile defining: a first security policy defining a subset of resources, in the set of resources, to which the first application is permitted access and a first action responsive to a first violation of the first security policy.

Block S136 of the method S100 recites executing the first action in response to detecting an access by the first application to a first resource in the set of resources, the first resource excluded from the subset of resources.

Generally, the security agent can: access a configuration profile defining a security policy defining a subset of resources to which an application is permitted access; and detect a violation associated with access (or attempted access)—by the application—to a resource that is excluded from the subset of resources. The security agent can execute an action defined in the security policy in response to detecting the violation.

In one implementation, in Block S112, the security agent can access a configuration profile defining a security policy defining: a subset of resources—in the set of resources of the computing platform—to which the application is permitted access; and an action responsive to a first violation of the security policy. The security agent can: monitor the set of resources responsive to execution of the application on the computing platform in Block S130; and execute the action in response to detecting an access by the application to a resource excluded from the subset of resources in Block S136.

12.1.1 Event Record Example

In one example, in Block S112, the security agent can access a configuration profile defining a first security policy defining: a subset of memory addresses to which the application is permitted access; and a first action responsive to a violation of the first security policy, the first action including recording an event associated with the violation.

In response to detecting an access by the application to a memory address excluded from the subset of memory addresses, the security agent can record an event associated with the violation in Block S140, the event specifying first data associated with the violation such as: an application identifier; an identifier of the security device; an identifier of the computing platform; the resource accessed by the application; a date/time of the violation; etc. The security agent can record the event further specifying: second data associated with a first state of the system (e.g., the security device, the computing platform) during a first period preceding the violation; and third data associated with a second state of the system during a second period succeeding the violation.

In this example, the security agent can record the event in a storage device (e.g., a protected region of the storage device) of the computing platform. Additionally or alternatively, the security agent can record the event in a storage device of the security platform; and/or record the event at the management server.

12.1.2 Notification Example

In another example, in Block S112, the security agent can access the configuration profile defining a second security policy defining: a subset of network interfaces to which the application is permitted access; and a second action responsive to a violation of the second security policy, the second action including transmitting a notification specifying the first violation to a user device (e.g., a user device associated with the computing platform). In response to detecting an access by the application to a network interface excluded from the subset of network interfaces, the security agent can transmit the notification—specifying the violation—to the user device in Block S142. Additionally, the security agent can transmit the notification to the management server.

In this example, the security agent can: access the configuration profile further defining cryptographic information (e.g., a third asymmetric key pair) associated with secure communication; encrypt a message—including the notification—based on the cryptographic information; and transmit the message to the user device and/or the management server.

12.1.3 Confirmation Prompt Example

In another example, in response to detecting a violation of a security policy by an application executing on the computing platform, the security agent can implement similar methods and techniques to prompt a user device to confirm the violation. More specifically, in response to detecting an access by an application to a resource excluded from a subset of resources to which the application is permitted access, the security agent can prompt a user device to confirm the access to the resource in Block S144.

In response to receiving—from the user device—a confirmation of the access to the resource by the application, the security agent can allow access to the resource by the application (e.g., via an application wrapper). More specifically, the security agent can allow access to the source by the application in response to receiving the confirmation—from the user device exhibiting multi-factor authentication—within a predefined time period (e.g., 15 minutes).

In this example, the security agent can prompt: a user device associated with a particular operator of the computing platform; a user device associated with an administrator of the computing platform; and/or a user device associated with a user identity corresponding to the computing platform.

12.1.4 Application Quarantine Example

In another example, in response to detecting a violation of a security policy by an application on the computing platform, the security agent can implement similar methods and techniques to quarantine the application. More specifically, in response to detecting an access by an application (e.g., an application executing in an application wrapper) to a resource excluded from a subset of resources to which the application is permitted access, the security agent can quarantine the application in Block S146.

12.1.6 Safety Response Example

In another example, in response to detecting a violation of a security policy by an application executing on the computing platform, the security agent can implement similar methods and techniques to trigger a safety-critical response of the computing platform, such as issuing a command to cause the computing platform to enter a safe state (e.g., disengage power, disconnect fuel supply). More specifically, in response to detecting an access by an application to a resource excluded from a subset of resources to which the application is permitted access, the security agent can issue a command (or signal) to cause the computing platform to enter a safe state in Block S148.

In this example, the security agent can issue the command (e.g., a first command) to the security device, the computing platform, a local emergency stop device connected to the computing platform, a remote emergency stop device (or fieldbus) communicatively coupled to the computing platform, and/or other controllers. The security agent can issue the first command—in a set of commands—exhibiting a minimum hamming distance (e.g., 4, 8) from other commands in the set of commands.

12.2 Unusual Resource Usage Pattern

In one implementation, in Block S112, the security agent can access a configuration profile defining a security policy defining: a model characterizing an expected usage pattern of a subset of resources—to which an application is permitted access—by the application during execution on a computing platform; and an action responsive to a difference between an actual usage pattern of the application (e.g., during execution) and the model (e.g., the expected usage pattern) exceeding a predefined threshold amount (e.g., 5%, 15%). The security agent can: monitor the set of resources responsive to execution of the application on the computing platform in Block S130; generate a first usage pattern of resources utilized by the application during execution in Block S132; and execute the action in response to detecting a difference between the first usage pattern and the model exceeding the predefined threshold amount in Block S136.

Accordingly, the security agent can detect unexpected behavior by the application during execution, thereby enabling the security agent to mitigate security and/or safety vulnerabilities on the computing platform attributed to this behavior.

12.3 Network Message Violation

In another implementation, in Block S112 the security agent can access a configuration profile defining a security policy defining: a periodic network message from the application at a predefined time interval; and an action responsive to a violation of the security policy. The security agent can: monitor a set of network messages transmitted by the application in Block S134; and execute the action in response to detecting absence of a network message from the application during a first time interval exceeding the predefined time interval in Block S136.

Additionally or alternatively, the security agent can monitor a payload of a message in the set of messages from the application. The security agent can execute an action, as described above, in response to detecting a fault state of the application based on the payload.

Accordingly, the security agent can detect a fault state of the application during execution, thereby enabling the security agent to mitigate security and/or safety vulnerabilities on the computing platform attributed to this state.

12.4 Network Communication Channel Violation

In one implementation, in Block S112, the security agent can access a configuration profile defining a security policy defining: a subset of network communication channels to which the application is permitted access; and an action responsive to a violation of the security policy. The security agent can monitor the set of resources responsive to execution of the application on the computing platform in Block S130. More specifically, the security agent can: monitor a set of network interfaces in the set of resources of the computing platform; and detect a group of network communication channels accessed by the application during execution.

In Block S136, the security agent can execute the action in response to detecting an access by the application to a network communication channel excluded from the subset of network communication channels. In one example, the security agent can transmit a notification to a user device via the management server. In another example, the security agent can issue a command—to the security device—to cause the computing platform to enter a safe state. In this example, in response to receiving the command to cause the computing platform to enter a safe state, the security device can transmit an emergency stop signal to the computing platform in Block S150.

13. SECURITY DEVICE MONITORING & SAFETY RESPONSES

Block S160 of the method S100 recites periodically transmitting a status message to the security device at a predefined time interval, the status message including a state indicator in a set of state indicators, each state indicator in the set of state indicators exhibiting a minimum hamming distance of 4 from another state indicator in the set of state indicators.

Block S162 of the method S100 recites, in response to detecting absence of a status message from the security agent during a first time interval exceeding a predefined time interval, transmitting a signal to cause the computing platform to enter a safe state.

Figure 4:
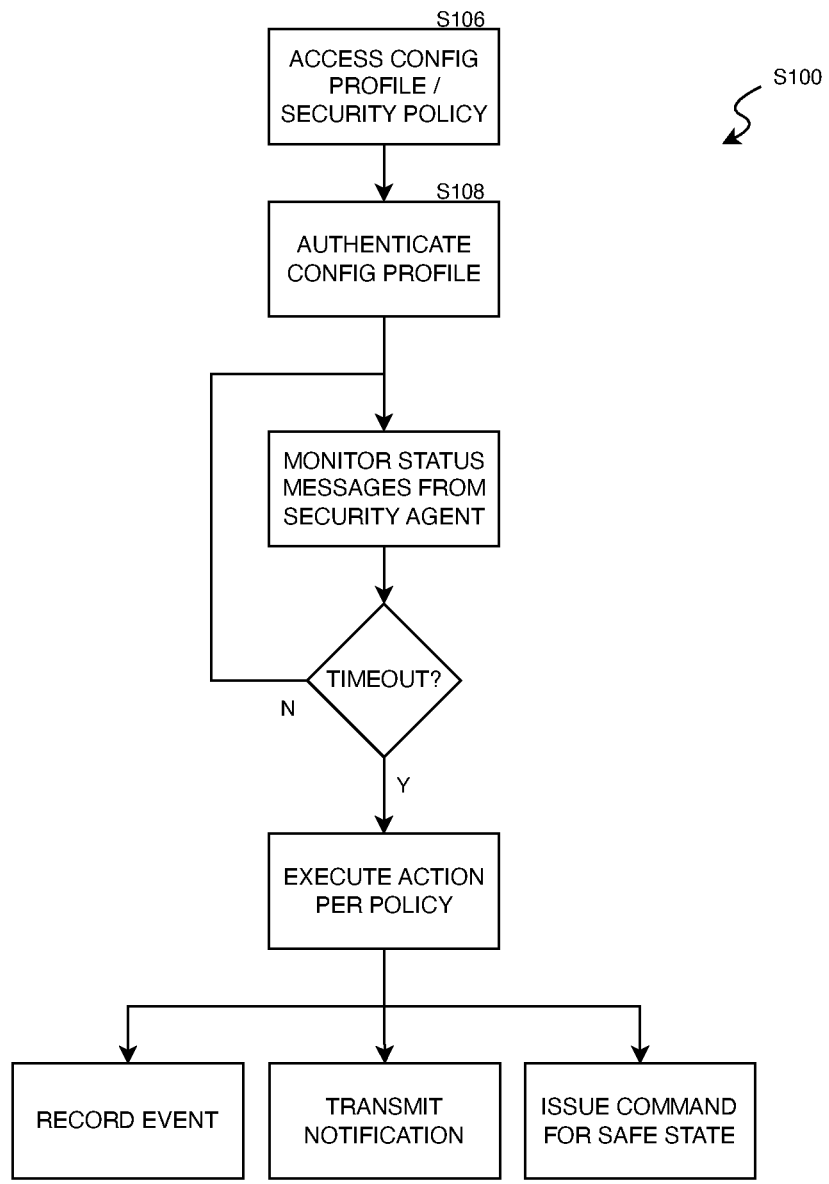
FIG. 4 is a flowchart representation of one variation of the method.

Generally, as shown in FIG. 4, the security device can implement similar methods and techniques described above: to access a configuration profile defining a security policy in Block S106; to monitor the computing platform (and/or the security device) during execution; and to execute an action (s)—defined in the security policy—in response to detecting a violation of the security policy.

In one implementation, the security device can access a configuration profile defining a security policy defining a periodic status message from the security agent at a predefined time interval (e.g., 200 milliseconds, 10 seconds, 5 minutes); and an action responsive to a violation of the security policy.

The security agent can periodically transmit a status message to the security device at the predefined time interval in Block S160. More specifically, the security agent can periodically transmit the status message including a state indicator in a set of state indicators, each state indicator in the set of state indicators exhibiting a minimum hamming distance (e.g., 4, 8) from another state indicator in the set of state indicators.

In this implementation, the security device can: monitor a set of status messages transmitted by the security agent in Block S162; and execute the action in response to detecting absence of a status message from the security agent during a first time interval exceeding the predefined time interval.

Additionally or alternatively, the security agent can monitor a payload of a status message in the set of status messages from the security agent. The security device can execute an action, as described above, in response to detecting a fault state of the security agent based on the payload.

Accordingly, the security agent can detect a fault state of the security agent during execution, thereby enabling the security device to mitigate security and/or safety vulnerabilities on the computing platform attributed to this state.

14. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising, at a security agent executing on a computing platform comprising a set of resources, an operating system, and a first application:
   during a first time period:
      authenticating the security agent with a security device based on first identity information associated with the security agent, the first identity information stored on the security device;
      in response to authenticating the security agent, accessing a configuration profile from the security device, the first configuration profile defining:
         second identity information associated with the operating system;
         third identity information associated with the first application; and
         a first security policy defining:
            a subset of resources, in the set of resources, to which the first application is permitted access; and
            a first action responsive to a first violation of the first security policy;
      authenticating the operating system based on the second identity information; and
      authenticating the first application based on the third identity information; and
   during a second time period succeeding the first time period:
      monitoring the set of resources responsive to execution of the first application on the computing platform; and
      executing the first action in response to detecting an access by the first application to a first resource in the set of resources, the first resource excluded from the subset of resources.

2. The method of claim 1:
wherein accessing the configuration profile defining the first security policy comprises accessing the configuration profile defining the first security policy defining:
 a subset of memory addresses, in the set of resources, to which the first application is permitted access; and
 the first action responsive to the first violation of the first security policy, the first action comprising recording an event associated with the first violation; and
wherein executing the first action comprises, in response to detecting an access by the first application to a first memory address in the set of resources, recording an event associated with the access by the first application to the first memory address, the first memory address excluded from the subset of memory addresses.

3. The method of claim 1:
wherein accessing the configuration profile defining the first security policy comprises accessing the configuration profile defining the first security policy defining:
 a subset of network interfaces, in the set of resources, to which the first application is permitted access; and
 the first action responsive to the first violation of the first security policy, the first action comprising transmitting a notification specifying the first violation to a user device; and
wherein executing the first action comprises transmitting the notification to the user device in response to detecting access by the first application to a first network interface in the set of resources, the first network interface excluded from the subset of network interfaces.

4. The method of claim 3:
wherein accessing the configuration profile comprises accessing the configuration profile further defining cryptographic information associated with secure communication;
wherein transmitting the notification to the user device comprises:
 encrypting a message, comprising the notification, based on the cryptographic information; and
 transmitting the message to the user device.

5. The method of claim 1:
wherein accessing the configuration profile comprises accessing the configuration profile further defining a second security policy defining:
 a first model characterizing an expected usage pattern of the subset of resources by the first application during execution on the computing platform; and
 a second action responsive to a second violation of the second security policy, the second violation characterized by a difference between a usage pattern and the first model exceeding a threshold amount; and
further comprising, during the second time period:
 generating a first usage pattern of the subset of resources by first application during execution on the computing platform; and
 executing the second action in response to detecting a difference between the first usage pattern and the first model exceeding the threshold amount.

6. The method of claim 1:
wherein accessing the configuration profile defining the first security policy comprises accessing the configuration profile defining the first security policy defining:
 the subset of resources, in the set of resources, to which the first application is permitted access; and
 the first action responsive to the first violation of the first security policy, the first action comprising issuing a first command, in a set of commands, to the security device to cause the computing platform to enter a safe state, the first command exhibiting a minimum hamming distance from other commands in the set of commands; and
wherein executing the first action comprises, in response to detecting the access by the first application to the first resource, issuing the first command to the security device to cause the computing platform to enter the safe state.

7. The method of claim 1, wherein authenticating the first application based on the third identity information comprises:
 initializing the first application in an application wrapper on the computing platform; and
 authenticating the first application based on the application wrapper and the third identity information.

8. The method of claim 7:
wherein accessing the configuration profile defining the first security policy comprises accessing the configuration profile defining the first security policy defining:
 the subset of resources, in the set of resources, to which the first application is permitted access; and
 the first action responsive to a violation of the first security policy, the first action comprising quarantining the first application;
wherein monitoring the set of resources responsive to execution of the first application on the computing platform comprises monitoring the set of resources responsive to execution of the first application in the application wrapper on the computing platform; and
wherein executing the first action comprises quarantining the first application in response to detecting access by the first application to the first resource.

9. The method of claim 1:
wherein accessing the configuration profile defining the third identity information comprises accessing the configuration profile defining the third identity information comprising validation information associated with a valid set of instructions representing the first application; and
wherein authenticating the first application based on the third identity information comprises authenticating the first application based on a cyclic redundancy check of the first application and the validation information.

10. The method of claim 9:
wherein accessing the configuration profile comprises accessing the configuration profile further defining a second security policy defining:
 a periodic cyclic redundancy check of the first application at a predefined time interval; and
 a second action responsive to a violation of the second security policy; and
further comprising, during the second time period:
 periodically performing a cyclic redundancy check of the first application and the validation information at the predefined time interval; and
 executing the second action in response to detecting a failure of a cyclic redundancy check of the first application and the validation information.

11. The method of claim 1:
wherein accessing the configuration profile comprises accessing the configuration profile further defining a second security policy defining:

a periodic network message from the first application at a predefined time interval; and a second action responsive to a violation of the second security policy; and further comprising, during the second time period:

monitoring a set of network messages from the first application; and executing the second action in response to detecting absence of a network message from the first application during a first time interval exceeding the predefined time interval.

12. The method of claim 1, further comprising, during the first time period, by the security agent:

in response to accessing the configuration profile from the security device, authenticating the configuration profile based on cryptographic information correlated with a unique identifier associated with a hardware security module of the security device, the cryptographic information stored in the hardware security module.

13. The method of claim 1:

wherein accessing the configuration profile defining the first security policy comprises:

accessing the configuration profile defining the first security policy defining:

the subset of resources to which the first application is permitted access; and the first action responsive to the first violation of the first security policy, the first action comprising transmitting a notification specifying the first violation to a management server; and accessing the configuration profile defining the first security policy, the configuration profile generated by the management server based on cryptographic information correlated with a unique identifier associated with the security device; and wherein executing the first action comprises, in response to detecting an access by the first application to the first resource, transmitting the notification to the management server.

14. The method of claim 1:

wherein accessing the configuration profile defining the first security policy comprises:

accessing the configuration profile defining the first security policy defining:

the subset of resources to which the first application is permitted access; and the first action responsive to the first violation of the first security policy, the first action comprising prompting a user device to confirm the first violation; and wherein executing the first action comprises, in response to detecting an access by the first application to the first resource, prompting an operator device to confirm the access by the first application to the first resource.

15. The method of claim 1, further comprising, during the second time period, by the security agent:

periodically transmitting a status message to the security device at a predefined time interval, the status message comprising a state indicator in a set of state indicators, each state indicator in the set of state indicators exhibiting a minimum hamming distance of 4 from another state indicator in the set of state indicators.

16. A method comprising, at a security agent executing on a computing platform comprising a set of resources and a first application:

during a first time period:

authenticating the security agent with a security device based on first identity information associated with the security agent;

in response to authenticating the security agent, accessing a configuration profile from the security device, the configuration profile generated based on second identity information associated with the security device, the first configuration profile defining:

third identity information associated with the first application; and a first security policy defining a subset of resources, in the set of resources, to which the first application is permitted access; and authenticating the first application based on the third identity information; and during a second time period succeeding the first time period:

monitoring the set of resources responsive to execution of the first application on the computing platform; and issuing a command to cause the computing platform to enter a safe state in response to detecting an access by the first application to a first resource in the set of resources, the first resource excluded from the subset of resources.

* * * * *